No. 716,748. Patented Dec. 23, 1902.

A. R. OTTERMAN.
SNAP HOOK.
(Application filed Nov. 26, 1901.)

(No Model.)

Witnesses:
Karl H. Butler
E. E. Potter

Inventor.
A. R. Otterman.
By
Attorneys

UNITED STATES PATENT OFFICE.

ARTHUR R. OTTERMAN, OF BRIDGEVILLE, PENNSYLVANIA, ASSIGNOR TO OTTERMAN MANUFACTURING COMPANY, OF BRIDGEVILLE, PENNSYLVANIA, A CORPORATION OF PENNSYLVANIA.

SNAP-HOOK.

SPECIFICATION forming part of Letters Patent No. 716,748, dated December 23, 1902.

Application filed November 26, 1901. Serial No. 83,698. (No model.)

*To all whom it may concern:*

Be it known that I, ARTHUR R. OTTERMAN, a citizen of the United States of America, residing at Bridgeville, in the county of Allegheny and State of Pennsylvania, have invented certain new and useful Improvements in Snap-Hooks, of which the following is a specification, reference being had therein to the accompanying drawings.

This invention relates to certain new and useful improvements in snap-hooks, and is particularly adapted for such snap-hooks as are employed on the ends of breast or neck yokes for connecting with the breast-straps of the harness, though the form of snap-hook shown may readily be employed for connection with the neck-yoke centrally thereof or for whiffletree snap-hooks or the like.

The primary object of the invention is to construct a hook in which the pivoted part of the hook member is shaped to engage in the seat provided therefor in the free end of the rigid member of the hook and also to so construct the pivoted member of the hook as to permit the easy operation thereof and at the same time insure a firm engagement of the free end thereof with the seat in the end of the rigid member.

With the above and other objects in view the invention consists in the novel combination and arrangement of parts to be hereinafter more fully described, and specifically pointed out in the claim.

In describing the invention in detail reference is had to the accompanying drawings, forming a part of this specification, and wherein like numerals of reference indicate corresponding parts throughout the several views, in which—

Figure 1:
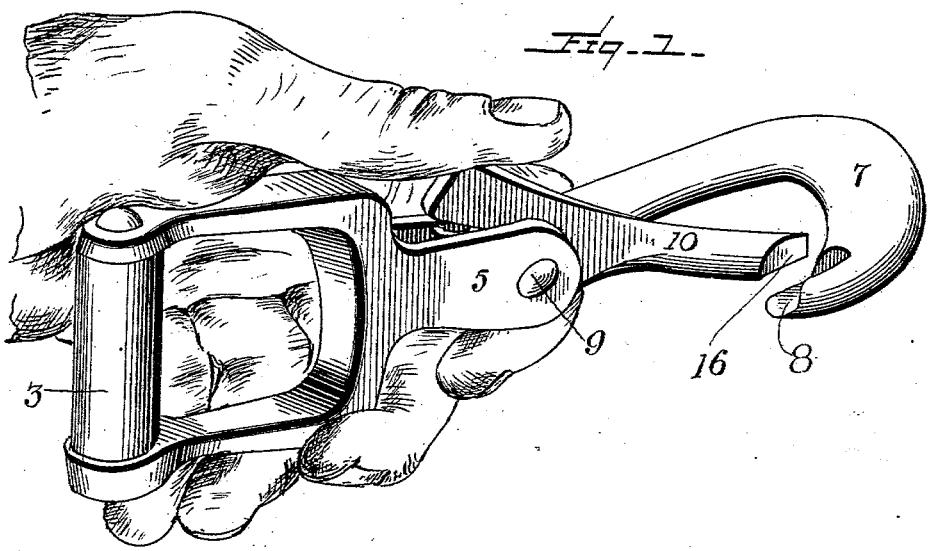
Figure 2:
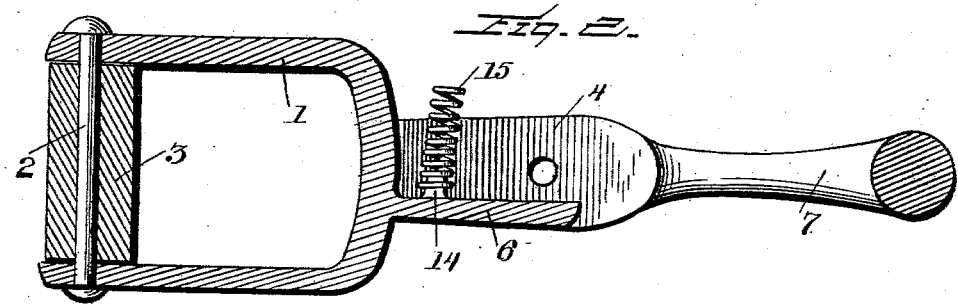
Figures 3, 4:
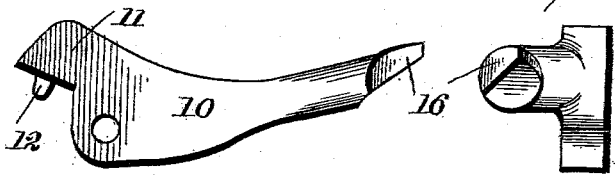
Figure 5:
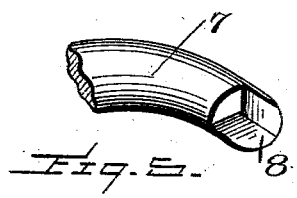

Figure 1 is a detail perspective view of my improved snap-hook, showing the same partially open and the manner of operating. Fig. 2 is a longitudinal sectional view of the hook. Fig. 3 is a detail perspective view of the pivoted portion or member of the hook. Fig. 4 is an end view of the same. Fig. 5 is a detail perspective view of the stationary portion or member of the hook.

To put my invention into practice, I provide the clevis 1, into the outer end of which is mounted on the rivet 2 a suitable roller 3. This clevis carries a frame consisting of side walls 4 5 and a bottom 6, the side wall or extension 4 having an integral hook member 7, the free end of which is provided with a recess 8, the walls of which are shaped to conform to the shape of the end of the pivoted hook member, as will be further described. The side wall or extension 5 of the frame is parallel with the side wall or extension 4, and these two walls are apertured to receive the rivet 9, upon which the pivoted portion or member 10 of the hook is mounted. This pivoted member 10 has an extension 11, which projects normally above the top edge of the side walls or extensions 4 5 and on its underneath face carries a stud 12. A like stud 14 is secured on the upper face of the bottom 6, and these two studs engage in the ends of the coil-spring 15, arranged between the extension 11 and the bottom 6 to hold the free end of the portion or member 10 normally in engagement with the seat 8 in the member 7. The free end of the member 10 is cut away, as at 16, to form differently-disposed inclined faces, which conform to the three inclined faces or walls of the seat 8, the said end of the member 10 engaging in said seat in a manner that when fully seated the outer face of the pivoted member will be flush with the outer face of the stationary member. This recess or seat 8 is substantially V-shaped and has an end wall against which one of the inclined faces of the free end of member 10 abuts, the face 16 bearing against the outer of the walls formed by the V-shaped recess, and the bottom of this free end member 10 engages the other wall formed by said V-shaped recess.

The operation of the device will be readily apparent from the illustration given in Fig. 1, as it will be observed that pressure on the extension 11 will compress the spring 15 and elevate the free end of the member 10, so as to permit the engagement or disengagement of the hook with the ring or other device. When used as a breast-strap hook, the breast-strap will be passed through the opening in the clevis and the roller 3 will operate on the breast-strap. If the hook is to be used for connection centrally of the breast or neck yoke, the roller 3 would be removed and the rivet would be passed through the breast or neck yoke, as will be readily apparent.

In the construction of the device it will be observed that various changes may be made in the details of construction without departing from the general spirit of my invention.

Having fully described my invention, what I claim as new, and desire to secure by Letters Patent, is—

In a snap-hook, the combination of a clevis, a frame carried on one end of said clevis and comprising parallel side walls and a bottom, an upwardly-extending stud carried by the bottom near the rear end of the bottom, a hook member formed integral with one of the side walls of the frame, said hook member having a recess in its upper face at the free end, a second hook member pivotally mounted between the side walls of the frame with its free end shaped to fit the recess in the end of the first-mentioned hook member, a projection carried by the rear end of the hook member and extending normally above the frame to be engaged and depressed for elevating the outer end of said pivoted hook member, a stud carried by the underneath face of said projection, and a spring held by said stud and the stud on the bottom for holding said projection normally elevated and the outer end in engagement with the recess in the other hook member.

In testimony whereof I affix my signature in the presence of two witnesses.

ARTHUR R. OTTERMAN.

Witnesses:
JOHN NOLAND,
E. E. POTTER.